(12) United States Patent
Deng

(10) Patent No.: US 11,158,318 B2
(45) Date of Patent: Oct. 26, 2021

(54) AI VOICE INTERACTION METHOD, DEVICE AND SYSTEM

(71) Applicant: Shenzhen Aukey Smart Information Technology Co., Ltd., Shenzhen (CN)

(72) Inventor: Chao Deng, Shenzhen (CN)

(73) Assignee: Shenzhen Aukey Smart Information Technology Co., Ltd., Shenzhen (CN)

( * ) Notice: Subject to any disclaimer, the term of this patent is extended or adjusted under 35 U.S.C. 154(b) by 95 days.

(21) Appl. No.: 16/702,784

(22) Filed: Dec. 4, 2019

(65) Prior Publication Data

US 2020/0105268 A1 Apr. 2, 2020

Related U.S. Application Data

(63) Continuation of application No. PCT/CN2018/087577, filed on May 18, 2018.

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/165* (2013.01); *G06N 5/04* (2013.01); *G10L 15/1815* (2013.01);
(Continued)

(58) Field of Classification Search
CPC . G06F 1/163; G06F 3/16; G06F 3/165; G06F 9/451; G06F 3/013; G06F 40/226;
(Continued)

(56) References Cited

U.S. PATENT DOCUMENTS 5,677,964 A * 10/1997 Sun ................. H04R 1/105
381/189
8,213,647 B2 * 7/2012 Bilt ................. H04R 1/1066
381/304
(Continued)

FOREIGN PATENT DOCUMENTS

CN 105634069 A 6/2016
CN 106205293 A 12/2016
(Continued)

OTHER PUBLICATIONS

First Office Action in counterpart Chinese Application 201810644215.5, dated Apr. 28, 2019.
(Continued)

*Primary Examiner* — Gerald Gauthier
(74) *Attorney, Agent, or Firm* — Westbridge IP LLC

(57) ABSTRACT

The present disclosure provides an AI voice interaction method, including: an earphone acquiring a user voice; a body receiving a digital voice signal sent by the earphone through a wireless communication, and sending the digital voice signal through mobile data or WiFi to a cloud server; the cloud server performing a voice recognition and semantic analysis on the digital voice signal; the body making a call or sending network data to the body according to the analysis result, to make the earphone perform a corresponding voice broadcast according to the network data. Accordingly, the present disclosure also provides an AI voice interaction device and system.

11 Claims, 14 Drawing Sheets

(51) Int. Cl.
*G06N 5/04* (2006.01)
*G10L 15/18* (2013.01)
*G10L 15/30* (2013.01)
*H04L 29/08* (2006.01)
*H04R 1/10* (2006.01)
*H04W 84/12* (2009.01)
*H04W 88/02* (2009.01)

(52) U.S. Cl.
CPC .............. *G10L 15/30* (2013.01); *H04L 67/10* (2013.01); *H04R 1/1016* (2013.01); *H04R 1/1041* (2013.01); *G10L 2015/223* (2013.01); *H04R 2420/07* (2013.01); *H04W 84/12* (2013.01); *H04W 88/02* (2013.01)

(58) Field of Classification Search
CPC ...... G06N 5/04; G06N 7/005; G10L 15/1815; G10L 15/22; G10L 15/30; G10L 21/028; G10L 21/0356; G10L 2015/223; H04B 5/0006; H04L 67/10; H04R 1/1016; H04R 1/1041; H04R 1/1091; H04R 3/14; H04R 5/04; H04R 2420/07; H04R 1/1058; H04R 1/1066; H04R 5/033; H04S 1/005; H04W 84/12; H04W 88/02; H04W 4/12; G06T 11/206; H04M 1/026
USPC ........... 381/66, 74, 111, 304, 380, 381, 385; 702/19; 704/232, 275
See application file for complete search history.

(56) References Cited

U.S. PATENT DOCUMENTS

| | | | | |
|---|---|---|---|---|
| 8,233,656 | B2* | 7/2012 | Knight | H04R 1/1058 |
| | | | | 381/380 |
| 8,553,923 | B2* | 10/2013 | Tiscareno | H04R 1/1016 |
| | | | | 381/381 |
| 9,467,761 | B2* | 10/2016 | Grinker | H04R 1/1016 |
| 9,961,434 | B2* | 5/2018 | Kelly | H04R 1/1066 |
| 10,200,803 | B1* | 2/2019 | Tong | H04S 1/005 |
| 10,244,307 | B1* | 3/2019 | Tong | H04L 1/16 |
| 10,602,259 | B1* | 3/2020 | Huang | H04R 1/1066 |
| 10,997,514 | B1* | 5/2021 | Moriarty | G06N 7/005 |
| 11,055,885 | B1* | 7/2021 | Schwaiger | G06T 11/206 |
| 2006/0088171 | A1* | 4/2006 | Yeh | H04R 5/0335 |
| | | | | 381/74 |
| 2008/0154610 | A1* | 6/2008 | Mahlbacher | G08C 17/02 |
| | | | | 704/275 |
| 2008/0260196 | A1* | 10/2008 | Tsai | H04R 1/1008 |
| | | | | 381/380 |
| 2009/0141924 | A1* | 6/2009 | Her | H04R 1/1075 |
| | | | | 381/380 |
| 2009/0157325 | A1* | 6/2009 | Jung | A61B 5/6887 |
| | | | | 702/19 |
| 2012/0163633 | A1* | 6/2012 | Yang | H04R 1/1041 |
| | | | | 381/111 |
| 2012/0237047 | A1* | 9/2012 | Neal | H04B 3/234 |
| | | | | 381/66 |
| 2014/0379341 | A1 | 12/2014 | Seo et al. | |
| 2017/0195466 | A1* | 7/2017 | Chen | H04R 1/1041 |
| 2017/0352363 | A1* | 12/2017 | Thoen | G10L 21/0356 |
| 2017/0359467 | A1* | 12/2017 | Norris | H04S 7/304 |
| 2018/0331724 | A1* | 11/2018 | Li | H04B 5/0006 |
| 2018/0359349 | A1* | 12/2018 | Graylin | H04M 1/72433 |
| 2019/0079783 | A1* | 3/2019 | Hardi | G06F 3/167 |
| 2019/0196777 | A1* | 6/2019 | Kovacevic | G06F 16/65 |
| 2020/0105268 | A1* | 4/2020 | Deng | G10L 15/30 |
| 2020/0110439 | A1* | 4/2020 | Deng | G06F 1/163 |
| 2020/0110569 | A1* | 4/2020 | Deng | H04S 1/007 |
| 2021/0105435 | A1* | 4/2021 | Ritchey | H04N 7/142 |

FOREIGN PATENT DOCUMENTS

| | | |
|---|---|---|
| CN | 106297802 A | 1/2017 |
| CN | 106448678 A | 2/2017 |
| CN | 106878849 A | 6/2017 |
| CN | 106954115 A | 7/2017 |
| CN | 108566478 A | 9/2018 |
| CN | 208509036 U | 2/2019 |
| EP | 2669889 A2 | 12/2013 |
| WO | 2017201500 A1 | 11/2017 |

OTHER PUBLICATIONS

International Search Report in corresponding PCT application PCT/CN2018/087577, dated Feb. 3, 2019.
Second Office Action in counterpart Chinese Application 201810644215.5, dated Nov. 4, 2019.
Partial Supplementary European Search Report issued in counterpart European Patent Application No. 18919154.7, dated Mar. 24, 2021.

* cited by examiner

AI VOICE INTERACTION METHOD, DEVICE AND SYSTEM

CROSS-REFERENCE TO RELATED APPLICATIONS

The present disclosure is a Continuation Application of PCT Application No. PCT/CN2018/087577, filed on May 18, 2018, the entire contents of which are incorporated herein by reference.

TECHNICAL FIELD

The present disclosure relates to the technical field of portable voice devices, and in particular, to an AI voice interaction method, device and system.

BACKGROUND

Echo (Echo Protocol) is routine and also the most commonly used data packet in the network. The path of the current connection node may be known by sending the echo packet, and the path length may be obtained by the round trip time. Amazon's Echo Dot can listen to, play, connect to and control other devices. Echo Dot, which is essentially Echo's "Mini-Me", a cloud-based, voice-activated AI voice interactive device that understands for a ready-to-call Ski with entity, the user wakes up the Echo Dot function by saying her name or other keywords. Echo Dot's built-in microphone array is always ready to listen to sound from all around. Once the keywords are identified, the microphones will record any subsequent words and send them to Amazon's cloud server, which will recognize the voice commands and return instructions to tell Alexa how to respond.

Existing Echo Dot often do not have their own speakers, jacks and cables are needed to be connected with existing speakers, or the Echo Dot may be connected to existing speakers via Bluetooth. In addition, the Dot microphone array performs slightly worse at picking up voice commands, especially when playing music or in a noisy environment, users need to shorten their distance from the Echo Dot to complete the activation, otherwise the command may not be recognized quickly, the user experience is not good, and the use is inconvenient.

SUMMARY

The present disclosure provides an AI voice interaction method, device and system. The AI voice interactive device is a portable device that can be worn by the user, and has good sound pickup capability, can perform fast voice recognition, and has an excellent user experience.

According to a first aspect, the present disclosure provides an AI voice interaction method, including:

an earphone acquiring a user voice, performing an analog-to-digital conversion on the user voice to obtain a digital voice signal, and sending the digital voice signal through a wireless communication;

a body receiving the digital voice signal sent by the earphone through the wireless communication, and sending the digital voice signal through mobile data or WiFi;

a cloud server receiving the digital voice signal sent by the mobile data or the WiFi, and performing a voice recognition and a semantic analysis on the digital voice signal;

the cloud server sending a communication command to enable the body to make a call, in response to a determination that a semantic analysis result is related to a phone dialing; and the cloud server processing network data based on the semantic analysis result, calling corresponding network data, and sending the network data to the body, in response to a determination that the semantic analysis result is not related to the phone dialing; and the body sending a voice during the call or the network data to the earphone, to make the earphone perform a corresponding voice broadcast.

According to a second aspect, the present disclosure provides an AI voice interaction system, including:

an earphone configured for acquiring a user voice, performing an analog-to-digital conversion on the user voice to obtain a digital voice signal, and sending the digital voice signal through a wireless communication;

a body wirelessly and detachably connected to the earphone, and configured for receiving the digital voice signal sent by the earphone through the wireless communication, and sending the digital voice signal through mobile data or WiFi; and a cloud server configured for receiving the digital voice signal sent by the mobile data or the WiFi, and performing a voice recognition and a semantic analysis on the digital voice signal; sending a communication command to enable the body to make a call, in response to a determination that a semantic analysis result is related to a phone dialing; and processing network data based on the semantic analysis result, calling corresponding network data, and sending the network data to the body, in response to a determination that the semantic analysis result is not related to the phone dialing, and the body is further configured for sending the received voice during the call or the network data to the earphone through the wireless communication, to make the earphone perform a corresponding voice broadcast, and the earphone is embedded in the body and electrically connected to the body for charging.

According to a third aspect, the present disclosure provides an AI voice interaction device, including:

an earphone configured for acquiring a user voice, performing an analog-to-digital conversion on the user voice to obtain a digital voice signal, and sending the digital voice signal through a wireless communication; and a body wirelessly and detachably connected to the earphone, and configured for receiving the digital voice signal sent by the earphone through the wireless communication, and sending the digital voice signal through mobile data or WiFi; receiving a voice during the call or network data sent by an external device; and sending the received call voice or the network data to the earphone through the wireless communication, to make the earphone perform a corresponding voice broadcast, and the earphone is embedded in the body and electrically connected to the body for charging.

According to a fourth aspect, the present disclosure provides a computer readable storage medium, including a program, the program, when executed by a processor, implements the method of the first aspect.

According to the above embodiments of the present disclosure, the earphone separated from the body picks up a user voice. The voice signal is first received by the body via wireless communication and then sent to the cloud server through the body, and the voice recognition and semantic analysis are performed by the cloud server. According to the analysis result, the cloud server sends a communication command to make a call to the body, and call the corresponding network data after processing the network data, and then the network data is sent to the body. As such, the body can send the received voice existed in the call or the network data to the earphone, and the corresponding voice broadcast is performed by the earphone. Therefore, since the user's voice is picked up by the earphones worn on the ear, the sound pickup effect is better than the existing AI voice interaction device. And because most of the data processing is done in the cloud server, the voice recognition and semantic analysis are more accurate, and the obtained network data resources are also abundant. It also makes the body do not need a chip with high data processing capability, which can save the cost of the AI voice interaction device.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

DETAILED DESCRIPTION OF THE EMBODIMENTS

Figure 1:
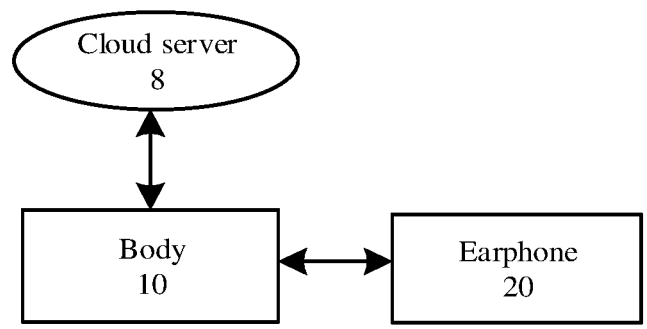
FIG. 1 is a schematic structural diagram of an AI voice interaction system according to the present disclosure.

The present disclosure will be further described in detail below with reference to the accompanying drawings. Similar elements in different embodiments employ similar reference numerals. In the following embodiments, many of the details are described in order to provide a better understanding of the disclosure. However, those skilled in the art can easily realize that some of the features may be omitted in different situations, or may be replaced by other elements, materials, and methods. In some cases, some operations related to the present disclosure have not been shown or described in the specification, in order to avoid that the core part of the disclosure is overwhelmed by excessive description. It is not necessary for those skilled in the art to describe these related operations in detail, and they can fully understand the related operations according to the description in the specification and the general technical knowledge in the field.

Besides, the features, operations, or characteristics described in the specification can be combined in any suitable manner to form various embodiments. Meanwhile, the operations or actions in the method description can also be sequentially changed or adjusted in a manner that can be apparent to those skilled in the art. Therefore, the various sequences in the description and the drawings are only for the purpose of clearly describing a particular embodiment, do not mean that it is an order of necessity, unless otherwise stated, one of the sequences must be followed.

The serial numbers themselves for the components herein, such as "first", "second", etc., are only used to distinguish the described objects, and do not have any order or technical meaning. As used herein, "connected" or "coupled", unless otherwise specified, includes both direct and indirect connections (coupling).

First Embodiment

Figure 2:
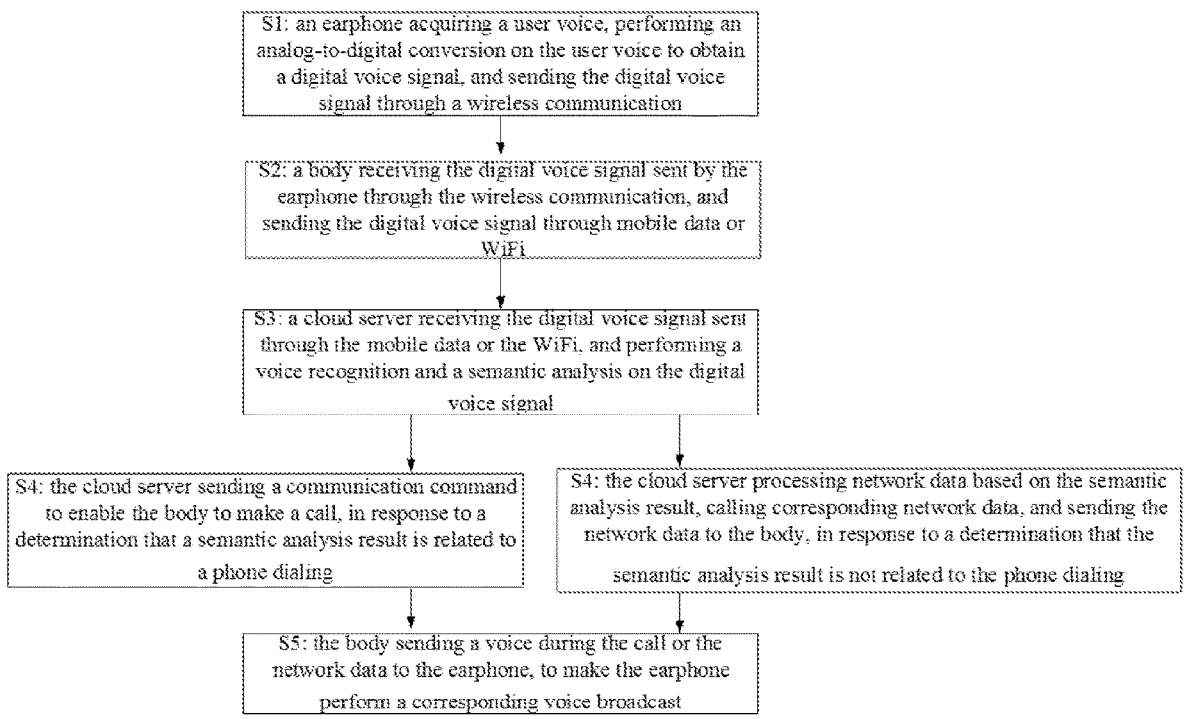
FIG. 2 is a schematic flow chart of an AI voice interaction method according to the present disclosure.
Figure 3:
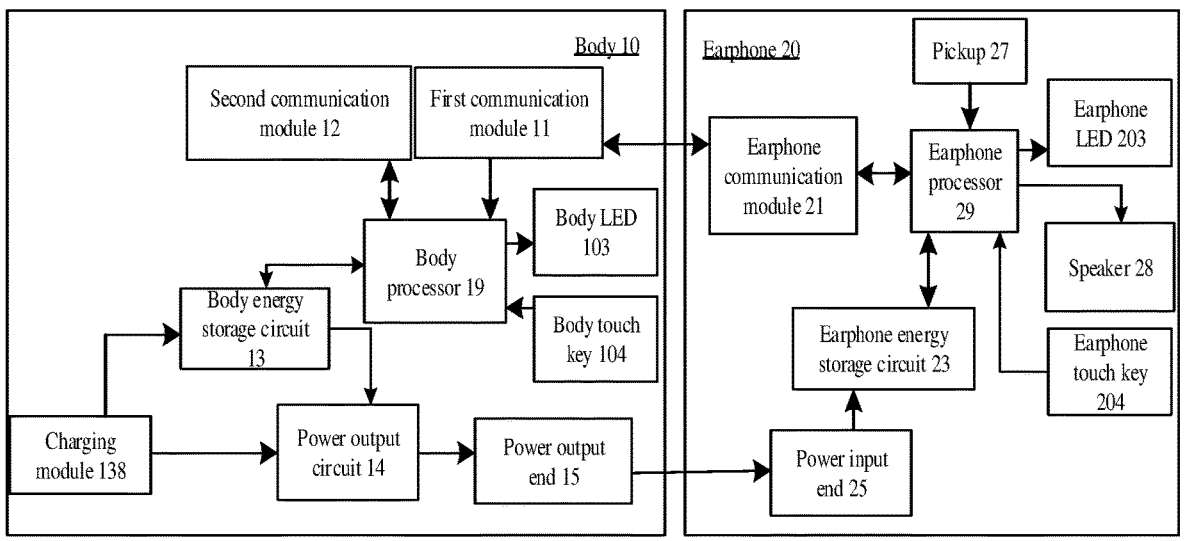
FIG. 3 is a structural block diagram of an AI voice interaction device according to the present disclosure.

Referring to FIG. 1 and FIG. 2, the present disclosure provides an AI voice interaction method, including:

Operation S1: an earphone 20 acquiring a user voice, performing an analog-to-digital conversion on the user voice to obtain a digital voice signal, and sending the digital voice signal through a wireless communication;

Operation S2: a body 10 receiving the digital voice signal sent by the earphone 20 through the wireless communication, and sending the digital voice signal through mobile data or WiFi;

Operation S3: a cloud server 8 receiving the digital voice signal sent by the body 10 through the mobile data or the WiFi, and performing a voice recognition and a semantic analysis on the digital voice signal;

Operation S4: the cloud server 8 sending a communication command to enable the body 10 to make a call, in response to a determination that a semantic analysis result is related to a phone dialing; the cloud server 8 processing network data based on the semantic analysis result, calling corresponding network data, and sending the network data to the body 10, in response to a determination that the semantic analysis result is not related to the phone dialing; and Operation S5: the body 10 sending a voice during the call or the network data to the earphone 20, to make the earphone 20 perform a corresponding voice broadcast.

In the operation S1: the wireless communication includes: WiFi, Bluetooth, infrared or RF communication.

In the operation S2: the body 10 also sends a login access request to the cloud server 8. After receiving the login access request, the cloud server 8 logs in to the interface of the corresponding cloud server 8 to perform the voice recognition and the semantic analysis on the digital voice signal.

In the operation S4, if the result of the analysis is related to the phone dialing or sending a short message, the analysis result is sent back to the body 10, and then the body 10 uses the existing technology to implement the function of making a call or sending a short message through the cellular transceiver; otherwise, the server 8 performs corresponding network data processing, calls corresponding network data, and sends the network data back to the body 10. After receiving the network data, the body 10 sends the network data to the earphone 20, so that the earphone 20 performs corresponding voice broadcast according to the network data.

For example, the cloud server 8 can launch a program to perform an Internet search (such as Baidu search) and send the search result back to the earphone 20 and broadcast it in a voice form, or launch the program to call the network music player resources for music playback, or launch a road navigation application (such as Gaode map) to navigate, or launch the program to order audio programs and so on.

As can be seen, since the user's voice is picked up by the earphones worn on the ear, the pickup effect is better than the existing AI voice interaction device. And because most of the data processing is done in the cloud server, the voice recognition and semantic analysis are more accurate, and the obtained network data resources are also richer. It also makes the body do not need a chip with high data processing capability, which can save the cost of the AI voice interaction device.

In some embodiments, the method further includes:

(1) Using the earphone 20 to search the body 10:

sending a search signal, by the earphone 20, through the wireless communication, in response to a determination that a touch key of the earphone is triggered; and receiving and responding to, by the body 10, the search signal through the wireless communication to make the body 10 emit at least one of an indicator light prompt and a voice prompt.

(2) Using the body 10 to search the earphone 20:

sending a search signal, by the body 10, through the wireless communication, in response to a determination that a touch key of the body is triggered; and receiving and responding to, by the earphone 20, the search signal through the wireless communication to make the earphone 20 emit at least one of an indicator light prompt and a voice prompt.

In this way, the signal interaction between the earphone 20 and the body 10 is realized, and the retrieval function is realized, so that the earphone 20 and the body 10 are not easily lost.

Correspondingly, referring to FIG. 1, the present disclosure provides an AI voice interaction system, including:

an earphone 20 configured for acquiring a user voice, performing an analog-to-digital conversion on the user voice to obtain a digital voice signal, and sending the digital voice signal through a wireless communication;

a body 10 wirelessly and detachably connected to the earphone 20, and configured for receiving the digital voice signal sent by the earphone through the wireless communication, and sending the digital voice signal through mobile data or WiFi; and a cloud server 8 configured for receiving the digital voice signal sent by the mobile data or the WiFi, and performing a voice recognition and a semantic analysis on the digital voice signal; sending a communication command to enable the body 10 to make a call, in response to a determination that a semantic analysis result is related to a phone dialing; and processing network data based on the semantic analysis result, calling corresponding network data, and sending the network data to the body 10, in response to a determination that the semantic analysis result is not related to the phone dialing; and the body 10 is further configured for sending the received voice during the call or the network data to the earphone 20 through the wireless communication, to make the earphone perform a corresponding voice broadcast; the earphone 20 is embedded in the body 10 and electrically connected to the body 10 for charging.

Correspondingly, referring to FIG. 1, the present disclosure provides an AI voice interaction device, including:

an earphone 20 configured for acquiring a user voice, performing an analog-to-digital conversion on the user voice to obtain a digital voice signal, and sending the digital voice signal through a wireless communication; and a body 10 wirelessly and detachably connected to the earphone 20, and configured for receiving the digital voice signal sent by the earphone 20 through the wireless communication, and sending the digital voice signal through mobile data or WiFi; and receiving a voice during the call or network data sent by an external device (including communication base and a cloud server 8); and sending the received call voice or the network data to the earphone 20 through the wireless communication, to make the earphone 10 perform a corresponding voice broadcast; and the earphone 20 is embedded in the body 10 and electrically connected to the body 10 for charging.

It should be noted that the body 10 is of a portable design that can be carried by the user and worn on the wrist, waist or neck.

Second Embodiment

Referring to FIG. 3 to FIG. 8, the present disclosure provides an AI voice interaction device, including:

the body 10 is in a car charger type, and the body 10 includes a upper casing 3011, a lower casing 3012 and a car charger plug 3013. The upper casing 3011 and the lower casing 3012 are clamped to form an outer casing of the body. An upper part of the car charger plug 3013 is provided with a spherical rotating head 3014, and the lower casing 3012 is sleeved on the spherical rotating head 3014. The upper casing 3011 defines an earphone slot 112, and a power output end 15 and a body magnetic device 105 are disposed under the earphone slot 112. The outer casing is provided with a self-locking ejector device 121, a body PCB 100, a charging module 138, and a body battery 130. The body PCB 100 includes a body processor 19, a first communication module 11, a second communication module 12, a body energy storage circuit 13 and a power output circuit 14.

The first communication module 11 is configured to be wirelessly connected to the earphone 20, and the second communication module 12 includes a mobile data network module, a cellular transceiver, and a WiFi transceiver. The body processor 19 is electrically connected to the first communication module 11, the second communication module 12, and the body energy storage circuit 13, respectively. The body energy storage circuit 13 is also electrically connected to the charging module 138, the power output circuit 14 and the body battery 130. The power output circuit 14 is also electrically connected to the power output end 15. The self-locking ejector device 121 has a spring structure for pressing the earphone 20 downwardly when the earphone 20 charged in the earphone slot 112 is removed, causing the spring structure to deform and generating an outward force to separate the earphone 20 from the body 10. The lower part of the car charger plug 3013 is provided with a metal connector for inserting into the car cigarette lighter to obtain electric energy, and the charging module 138 is also electrically connected with the car charger plug 3013 for obtaining electric energy.

In some embodiments, the second communication module 12 further includes an e-SIM card module 120. The e-SIM card module 120 is embedded inside the body 10, and the user does not need to purchase the device and insert the card. The user's network and package can be used directly by software registration or direct purchase. Since it is no longer necessary to specifically design a separate SIM card slot, the body 10 is lighter, thinner and is also less expensive to manufacture.

In some embodiments, the body 10 is also provided with a body LED 103 and a body touch key 104 that are both electrically connected to the body processor 19. The body LED 103 includes a power indicator light, a SIM card light, a WiFi light, and a voice light. For example:

(1) The power indicator light is set to 4 grids, when the power is displayed,

1) The power is greater than 75% and less than or equal to 100%, and the four-gird lights are all bright;

2) The power is greater than 50% and less than or equal to 75%, and the three-gird lights is bright;

3) The power is greater than 25% and less than or equal to 50%, and the two-gird lights are bright;

4) The power is greater than 10% and less than or equal to 25%, and one-gird light is bright;

5) The power is less than or equal to 10%, and one-gird light breathes.

(2) When the SIM card light status is indicated,

A green light indicates a signal, a flashing indicates a search, and a non-light indicates no service;

(3) When the WiFi light status is indicated,

A green light indicates a signal, a flashing indicates a search, and a non-light indicates no service;

When there is data transmission, the use of WiFi traffic indicates that the green light of the WiFi is breathing, and the use of the SIM card traffic indicates that the green light of the SIM card is breathing, and WiFi is preferentially used.

(4) When the voice light status is indicated,

After waking up, the green light is on. The green light flashes during the searching and the green light breathes when broadcasting.

Figure 4:
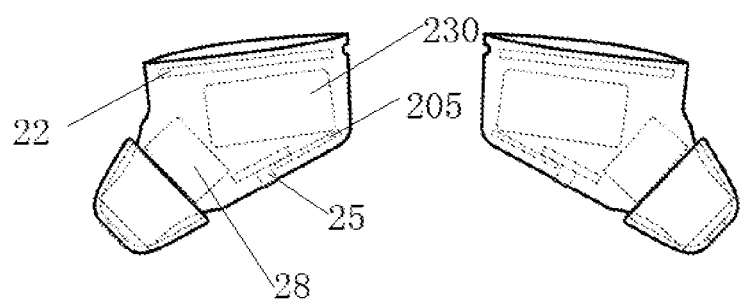
FIG. 4 is a side perspective view of an earphone according to an embodiment.
Figure 5:
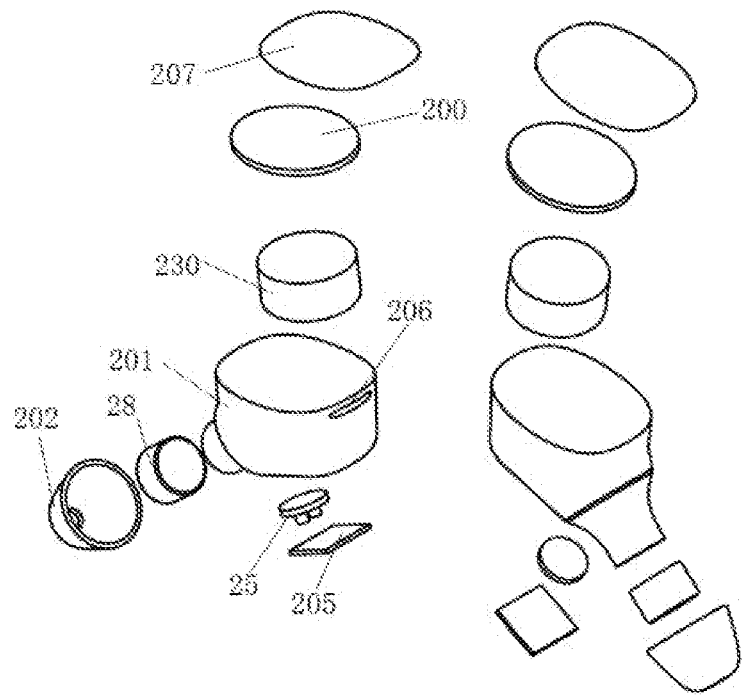
FIG. 5 is an exploded view of an earphone according to an embodiment.
Figure 6:
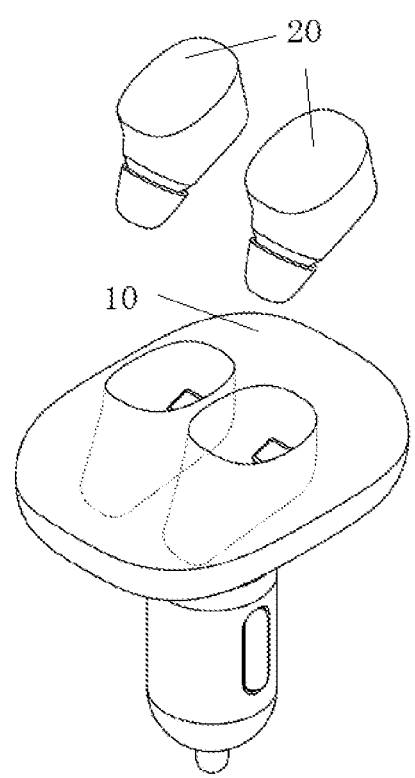
FIG. 6 is a schematic diagram of an AI voice interaction device in a split state according to a second embodiment.
Figure 7:
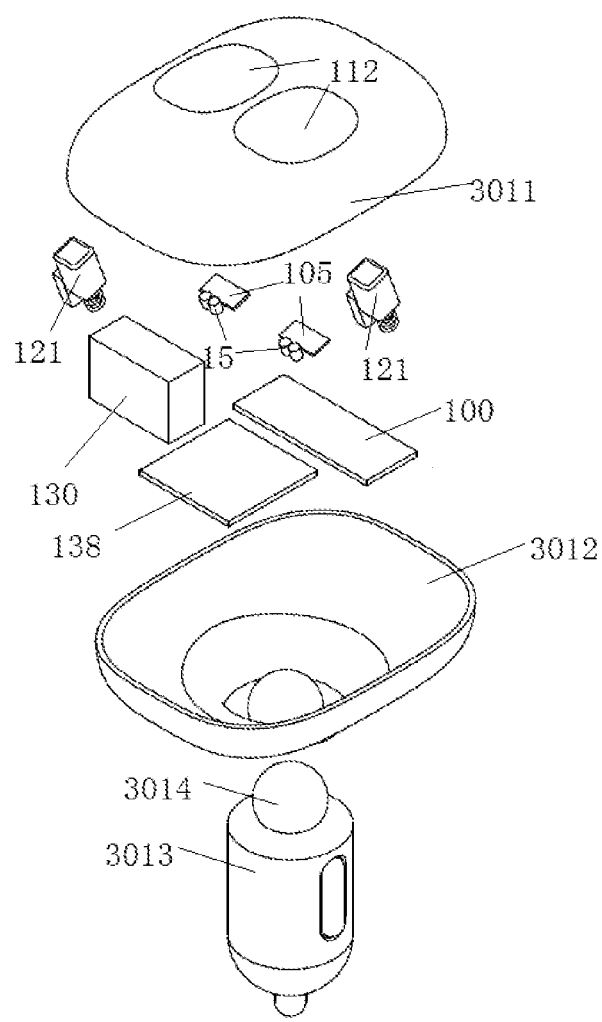
FIG. 7 is an exploded view of a body according to a second embodiment.
Figure 8:
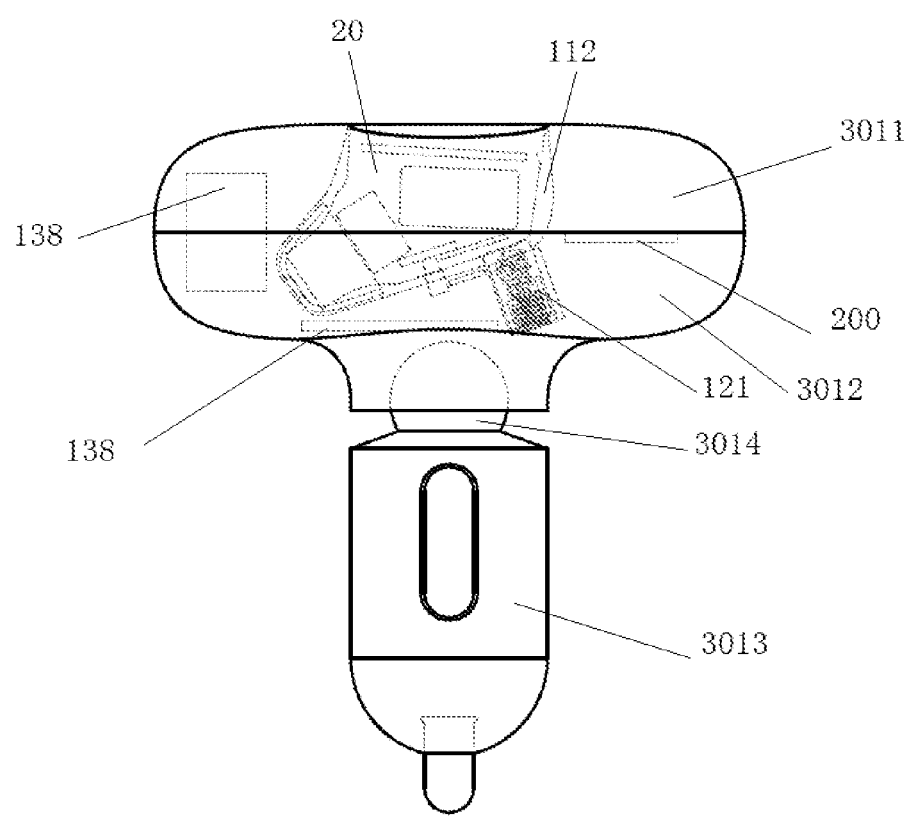
FIG. 8 is a side perspective view of an AI voice interactive device in a combined state according to a second embodiment.
Figure 9:
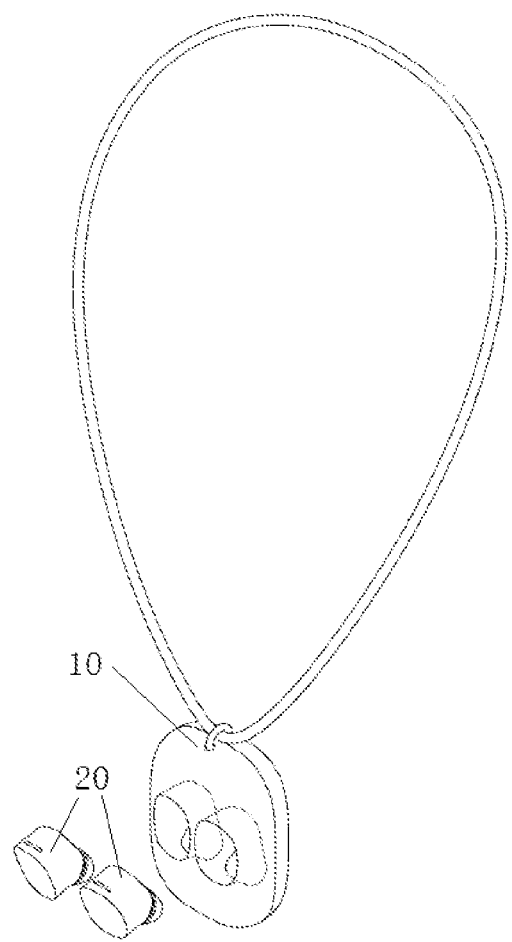
FIG. 9 is a schematic diagram of an AI voice interaction device in a split state according to a third embodiment.
Figure 10:
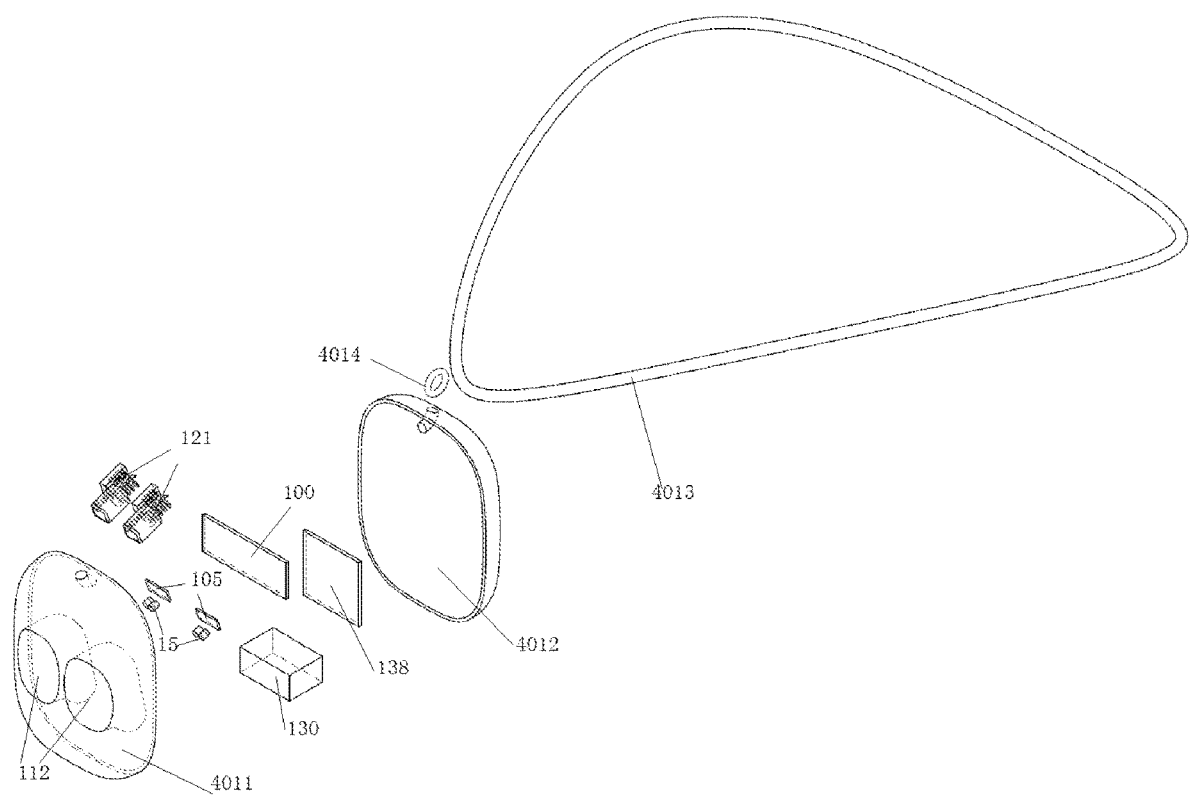
FIG. 10 is an exploded view of a body according to a third embodiment.
Figure 11:
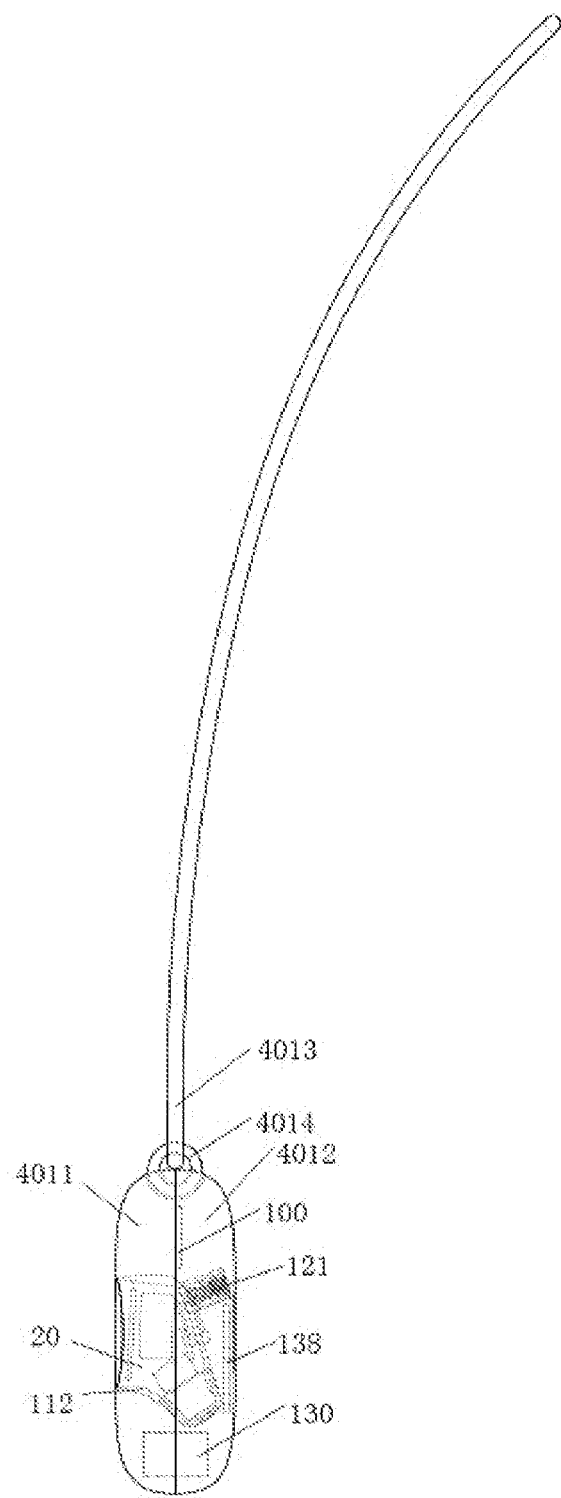
FIG. 11 is a side perspective view of an AI voice interactive device in a combined state according to a third embodiment.
Figure 12:
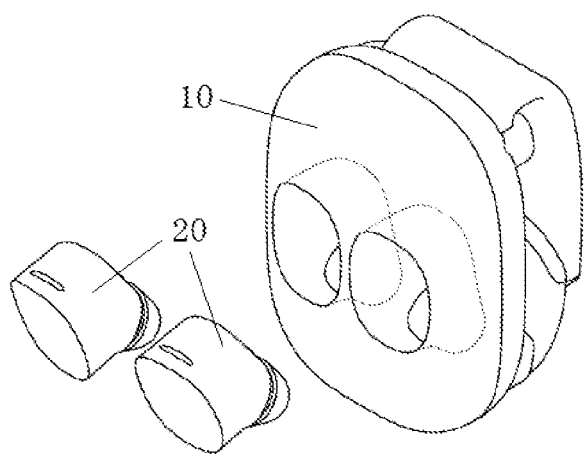
FIG. 12 is a schematic diagram of an AI voice interaction device in a split state according to a fourth embodiment.
Figure 13:
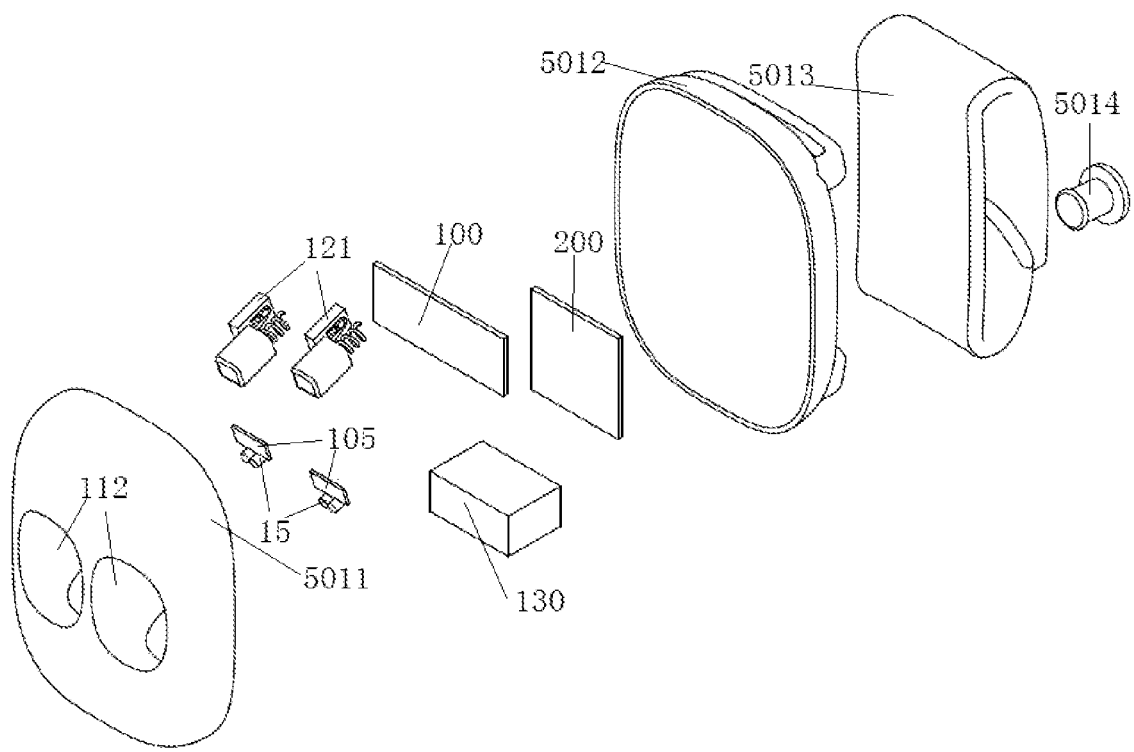
FIG. 13 is an exploded view of a body according to a fourth embodiment.
Figure 14:
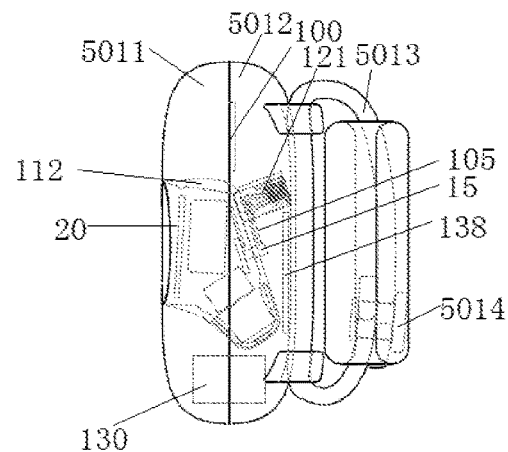
FIG. 14 is a side perspective view of an AI voice interactive device in a combined state according to a fourth embodiment.

As shown in FIG. 4 and FIG. 5, the earphone 20 is in-ear type, including a main earphone and an auxiliary earphone, and the main earphone and the auxiliary earphone are symmetrical. Both the main earphone and the auxiliary earphone include an in-ear soft rubber 202, an earphone outer casing 201 and an earphone upper cover 207. A power input end 25 and an earphone magnetic device 205 are disposed in the earphone outer casing 201 and away from the upper cover 207. A speaker 28, an earphone PCB 200 and a body battery 230 are also disposed in the earphone outer casing 201. The earphone PCB 200 is provided with a pickup 27, an earphone processor 29, an earphone communication module 21, and an earphone energy storage circuit 23. The earphone processor 29 is electrically connected to the earphone communication module 21, the pickup 27, the speaker 28 and the earphone storage circuit 23, respectively, and the earphone storage circuit 23 is also electrically connected to the earphone battery 230 and the power input/output end 25. The earphone communication module 21 is configured to be wirelessly connected to the first communication module 11 of the body 10, and the wireless communication includes: WiFi, Bluetooth, infrared or radio frequency communication. The power output end 15 and the power input end 25 include metal contacts or metal male and female connectors, and the earphone magnetic device 205 is configured for absorbing with the body magnetic device 105.

The upper cover 207 is disposed above the earphone PCB 200, and the earphone battery 230 is disposed under the earphone PCB 200, and the earphone battery 230 is electrically connected to the earphone PCB 200. The earphone magnetic device 205 is disposed under the earphone battery 230. The power input end 25 is disposed adjacent to the earphone magnetic device 205. The power input end 25 is electrically connected to the earphone energy storage circuit 23. The earphone outer casing 201 is provided with corresponding holes for electrically connecting the end metal head of the power input end 25 beyond the earphone outer casing 201 to the power output end 15 provided in the body outer housing. The earphone outer casing 201 is further provided with a pickup hole 206, and the pickup hole 206 is positioned opposite to the pickup 27 so that the pickup 27 picks up the user's voice signal.

The speaker 28 is disposed at the end of the earphone 20 and behind the in-ear soft rubber 202, so that the user can hear the call voice, the text conversion voice and the network data converted voice received by the earphone communication module 21.

In some embodiments, the earphone 20 is also provided with an earphone touch key 204 and an earphone LED 203 that are connected to the earphone processor 29.

In some embodiments, when playing the voice, the main earphone acquires the electrical signal (including the call voice and the network data sent back by the cloud server 8) sent by the body 10 through the first communication module 11 (Bluetooth module). After obtaining the voice signal, the main earphone sends the voice signal to the main earphone speaker for playback, and forwards the voice signal to the auxiliary earphone by means of near field communication such as microwave communication. When the user voice signal is picked up, the main earphone or the auxiliary earphone can pick up the user voice signal, and send the voice signal to the body 10 through the first communication module 11 (Bluetooth module). After the body 10 receives the voice signal, the body processor 19 denoises, compares, and merges the user voice respectively picked up from the main earphone and the auxiliary earphone into one voice signal.

In some embodiments, the earphone communication module 21 may wirelessly connected to the first communication module 11 through wireless connection methods such as WiFi, Bluetooth or infrared. Preferably, in an embodiment, the earphone communication module 21 may wirelessly connected to the first communication module 11 through Bluetooth, that is, the earphone communication module 21 and the first communication module 11 include a Bluetooth module. At this time, the earphone 20 can be a TWS earphone, a classic stereo bluetooth earphone or a classic one-sided bluetooth earphone.

In the above structure, when the earphone 20 is placed in the earphone slot 112 for charging, the in-ear soft rubber 202 faces inward, and the earphone upper cover 207 faces outward.

Third Embodiment

Referring to FIG. 3 to FIG. 5 and FIG. 9 to FIG. 11, the present disclosure provides an AI voice interaction device, including:

the body 10 is in a pendant type, and the body 10 includes a body front cover 4011, a body back cover 4012, and a necklace 4013. The body front cover 4011 and the body back cover 4012 are clamped to form a body outer casing. The necklace 4013 is connected to the outer casing of the body through a ring 4014. The body front cover 4011 defines an earphone slot 112. A power output end 15 and a body magnetic device 105 are disposed behind the earphone slot 112. A self-locking ejector device 121, a body PCB 100, a charging module 138 and a body battery 130 are disposed in the body outer casing. The body PCB 100 is provided with a body processor 100, a first communication module 11, a second communication module 12, a body energy storage circuit 13, and a power output circuit 14.

The first communication module 11 is configured to be wirelessly connected to the earphone 20, and the second communication module 12 includes a mobile data network module, a cellular transceiver, and a WiFi transceiver. The body processor 19 is electrically connected to the first communication module 11, the second communication module 12, and the body energy storage circuit 13, respectively. The body energy storage circuit 13 is also electrically connected to the charging module 138, the power output circuit 14 and the body battery 130. The power output circuit 14 is also electrically connected to the power output end 15. The self-locking ejector device 121 has a spring structure for pressing the earphone 20 downwardly when the earphone 20 charged in the earphone slot 112 is removed, causing the spring structure to deform and generating an outward force to separate the earphone 20 from the body 10. The charging module 138 includes an existing wireless charging module or a conventional USB interface charging module.

In some embodiments, the second communication module 12 further includes an e-SIM card module 120. The e-SIM card module 120 is embedded inside the body 10, and the user does not need to purchase the device and insert the card. The user's network and package can be used directly by software registration or direct purchase. Since it is no longer necessary to specifically design a separate SIM card slot, the body 10 is lighter, thinner and is also less expensive to manufacture.

In some embodiments, the body 10 is also provided with a body LED 103 and a body touch key 104 that are both electrically connected to the body processor 19. The body LED 103 includes a power indicator light, a SIM card light, a WiFi light, and a voice light.

The earphone 20 of this embodiment has the same structure as the earphone 20 of the second embodiment, and details are not described herein again.

In the above structure, when the earphone 20 is placed in the earphone slot 112 for charging, the in-ear soft rubber 202 faces inward, and the earphone upper cover 207 faces outward.

Fourth Embodiment

Referring to FIG. 3 to FIG. 5 and FIG. 12 to FIG. 15, the present disclosure provides an AI interaction device, including:

the body 10 is in a waist-hanged type, and the body 10 includes a body front cover 5011, a body back cover 5012 and a belt 5013. The waist-hanged body front cover 5011 and the body back cover 5012 are connected to the body outer casing. The body back cover 2015 is provided with a perforation for the belt 5013 to pass through. The belt 5013 is provided with an adjusting hole, and a button 5014 is fastened in the adjusting hole to fix the belt 5013. The body front cover 5011 defines an earphone slot 112. The power output end 15 and the body magnetic device 105 are disposed behind the earphone slot 112. The self-locking ejector device 121, the body PCB 100, the charging module 138 and the body battery 130 are disposed in the body outer casing. The body PCB 100 is provided with a body processor 100, a first communication module 11, a second communication module 12, a body energy storage circuit 13, and a power output circuit 14.

The first communication module 11 is configured to be wirelessly connected to the earphone 20, and the second communication module 12 includes a mobile data network module, a cellular transceiver, and a WiFi transceiver. The body processor 19 is electrically connected to the first communication module 11, the second communication module 12, and the body energy storage circuit 13, respectively. The body energy storage circuit 13 is also electrically connected to the charging module 138, the power output circuit 14 and the body battery 130. The power output circuit 14 is also electrically connected to the power output end 15. The self-locking ejector device 121 is a spring structure for pressing the earphone 20 downwardly when the earphone 20 charged in the earphone slot 112 is removed, causing the spring structure to deform and generating an outward force to separate the earphone 20 from the body 10. The charging module 138 includes an existing wireless charging module or a conventional USB interface charging module.

In some embodiments, the second communication module 12 further includes an e-SIM card module 120. The e-SIM card module 120 is embedded inside the body 10, and the user does not need to purchase the device and insert the card. The user's network and package can be used directly by software registration or direct purchase. Since it is no longer necessary to specifically design a separate SIM card slot, the body 10 is lighter, thinner and is also less expensive to manufacture.

In some embodiments, the body 10 is also provided with a body LED 103 and a body touch key 104 that are both electrically connected to the body processor 19. The body LED 103 includes a power indicator light, a SIM card light, a WiFi light, and a voice light.

The earphone 20 of this embodiment has the same structure as the earphone 20 of the second embodiment, and details are not described herein again.

In the above structure, when the earphone 20 is placed in the earphone slot 112 for charging, the in-ear soft rubber 202 faces inward, and the earphone upper cover 207 faces outward.

Fifth Embodiment

Referring to FIG. 3 and FIG. 15 to FIG. 18, the present disclosure provides an AI interaction device, including:

the body 10 is in a U-shaped neck-hanged type, and both ends of the body 10 are provided with the earphone slot 112 for placing the earphone 20. A power output end 15 and a body magnetic device 105 are disposed in the earphone slot 112. The self-locking ejector device 121, the body PCB 100, the charging module 138 and the body battery 130 are disposed in the neck-hanged body outer casing 601. The body PCB 100 is provided with the body processor 19, a first communication module 11, a second communication module 12, a body energy storage circuit 13, and a power output circuit 14.

The first communication module 11 is configured to be wirelessly connected to the earphone 20, and the second communication module 12 includes a mobile data network module, a cellular transceiver, and a WiFi transceiver. The body processor 19 is electrically connected to the first communication module 11, the second communication module 12, and the body energy storage circuit 13, respectively. The body energy storage circuit 13 is also electrically connected to the charging module 138, the power output circuit 14 and the body battery 130. The power output circuit 14 is also electrically connected to the power output end 15. The self-locking ejector device 121 is a spring structure for pressing the earphone 20 downwardly when the earphone 20 charged in the earphone slot 112 is removed, causing the spring structure to deform and generating an outward force to separate the earphone 20 from the body 10. The charging module 138 includes an existing wireless charging module or a conventional USB interface charging module.

In some embodiments, the second communication module 12 further includes an e-SIM card module 120. The e-SIM card module 120 is embedded inside the body 10, and the user does not need to purchase the device and insert the card. The user's network and package can be used directly by software registration or direct purchase. Since it is no longer necessary to specifically design a separate SIM card slot, the body 10 is lighter, thinner and is also less expensive to manufacture.

In some embodiments, the body 10 is also provided with a body LED 103 and a body touch key 104 that are both electrically connected to the body processor 19. The body LED 103 includes a power indicator light, a SIM card light, a WiFi light, and a voice light.

Figure 15:
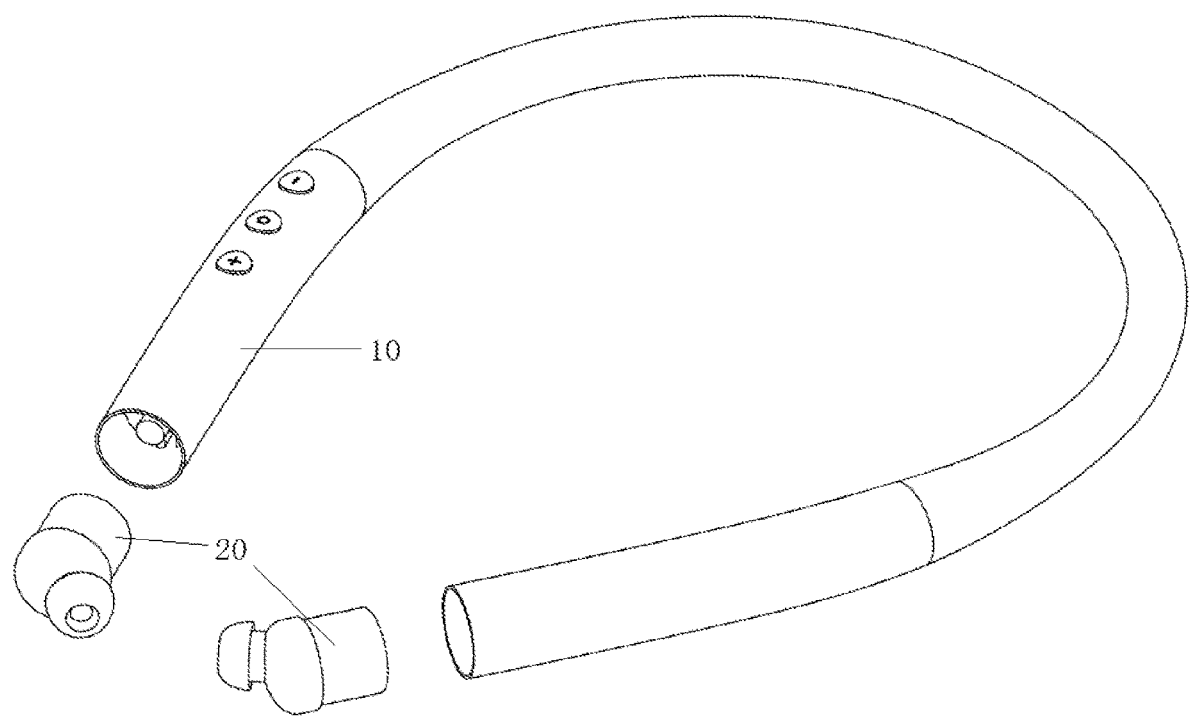
FIG. 15 is a schematic diagram of an AI voice interaction device in a split state according to a fifth embodiment.
Figure 16:
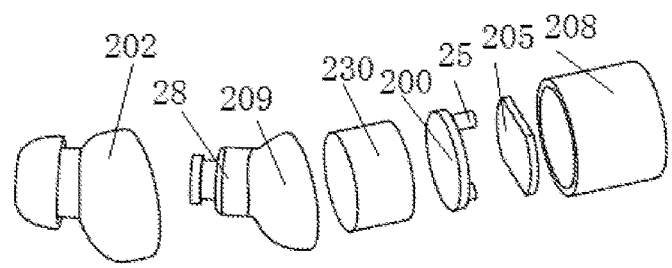
FIG. 16 is an exploded view of an earphone according to a fifth embodiment.
Figure 17:
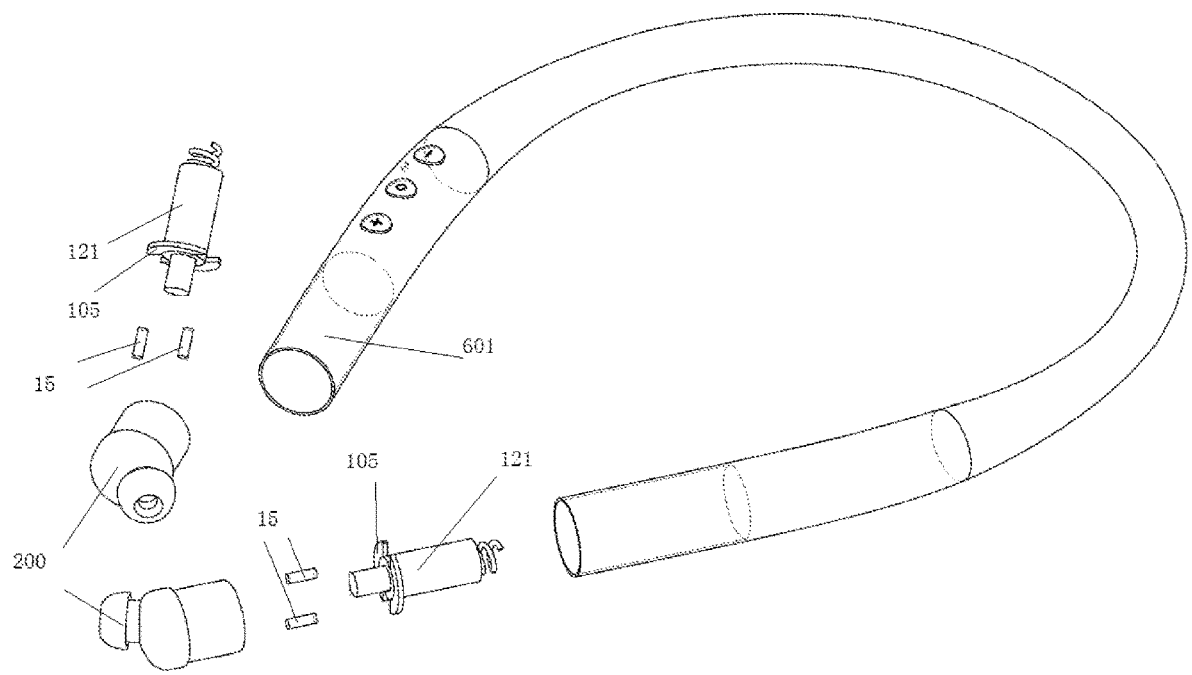
FIG. 17 is a schematic diagram of an AI voice interaction device in a disassembled state according to a fifth embodiment.
Figure 18:
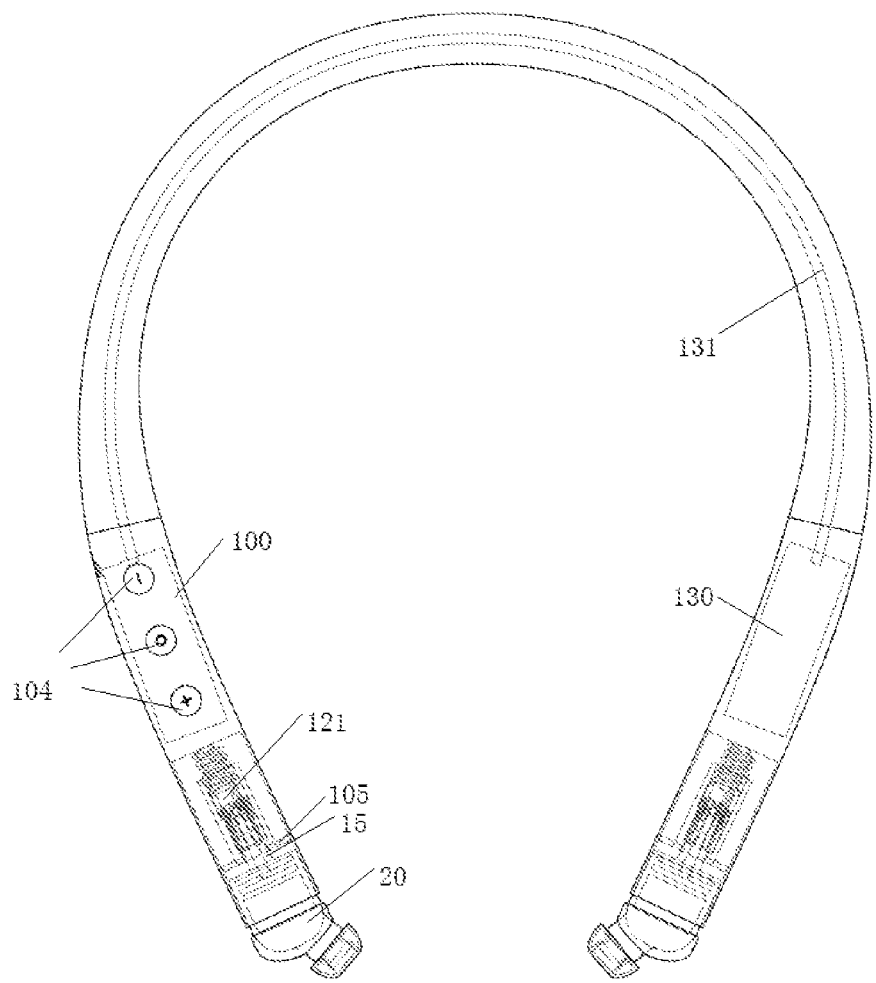
FIG. 18 is a side perspective view of an AI voice interactive device in a combined state according to a fifth embodiment.

As shown in FIG. 15 and FIG. 16, the earphone includes an in-ear soft rubber 20, an earphone front casing 209 and an earphone back cover 208. The earphone front casing 209 and the earphone back cover 208 are connected to the earphone outer casing. A power input end 25 and an earphone magnetic device 205 are disposed in the earphone outer casing and near the earphone back cover 208. A speaker 28, an earphone PCB 200 and a body battery 230 are disposed in the earphone outer casing. The earphone PCB 100 is provided with a pickup 27, an earphone processor 29, an earphone communication module 21, and an earphone energy storage circuit 23.

The earphone processor 19 is electrically connected to the earphone communication module 21, the pickup 27, the speaker 28 and the earphone storage circuit 23, respectively, and the earphone storage circuit 23 is also electrically connected to the earphone battery 230 and the power input/output end 25. The earphone communication module 21 is configured to be wirelessly connected to the first communication module 11 of the body 10, and the wireless communication includes: WiFi, Bluetooth, infrared or radio frequency communication. The power output end 15 and the power input end 25 include metal contacts or metal male and female connectors, and the earphone magnetic device 205 and the body magnetic device 105 are attracted to each other.

The upper cover 207 is disposed above the earphone PCB 200, and the earphone battery 230 is disposed under the earphone PCB 200, and the earphone battery 230 is electrically connected to the earphone PCB 200. The earphone magnetic device 205 is disposed under the earphone battery 230. The power input end 25 is disposed adjacent to the earphone magnetic device 205. The power input end 25 is electrically connected to the earphone energy storage circuit 23. The earphone back cover 208 is provided with corresponding holes for electrically connecting the end metal head of the power input end 25 beyond the earphone outer casing 201 to the power output end 15 provided in the body outer housing.

The speaker 28 is disposed at the end of the earphone 20 and behind the in-ear soft rubber 202, so that the user can hear the call voice, the text conversion voice and the network data converted voice received by the earphone communication module 21.

In some embodiments, the earphone 20 is also provided with an earphone touch key 204 and an earphone LED 203 that are connected to the earphone processor 29.

In some embodiments, when playing the voice, the main earphone acquires the electrical signal (including the call voice and the network data sent back by the cloud server 8) sent by the body 10 through the first communication module 11 (Bluetooth module). After obtaining the voice signal, the main earphone sends the voice signal to the main earphone speaker for playback, and forwards the voice signal to the auxiliary earphone by means of near field communication such as microwave communication. When the user voice signal is picked up, the main earphone or the auxiliary earphone can pick up the user voice signal, and send the voice signal to the body 10 through the first communication module 11 (Bluetooth module). After the body 10 receives the voice signal, the body processor 19 denoises, compares, and merges the user voice respectively picked up from the main earphone and the auxiliary earphone into one voice signal.

In some embodiments, the earphone communication module 21 may wirelessly connected to the first communication module 11 through wireless connection methods such as WiFi, Bluetooth or infrared. Preferably, in an embodiment, the earphone communication module 21 may wirelessly connected to the first communication module 11 through Bluetooth, that is, the earphone communication module 21 and the first communication module 11 include a Bluetooth module. At this time, the earphone 20 can be a TWS earphone, a classic stereo bluetooth earphone or a classic one-sided bluetooth earphone.

In the above structure, when the earphone 20 is placed in the earphone slot 112 for charging, the in-ear soft rubber 202 faces outward, and the earphone back cover 208 faces inward.

Those skilled in the art can understand that all or part of the functions of the various methods in the above embodiments may be implemented by hardware or by a computer program. When all or part of the functions in the above embodiments are implemented by means of a computer program, the program may be stored in a computer readable storage medium. The storage medium may include a read only memory, a random access memory, a magnetic disk, an optical disk, a hard disk, etc., and the program is executed by a computer to implement the above functions. For example, the program is stored on the memory of the device, and when the program on the memory is executed by the processor, all or part of the above functions can be realized. In addition, when all or part of the functions in the above embodiments are implemented by a computer program, the program may also be stored in a storage medium such as a server, another computer, a magnetic disk, an optical disk, a flash drive, or a mobile hard disk. The download or copy is saved to the memory of the local device, or the system of the local device is updated. When the program in the memory is executed by the processor, all or part of the functions in the above embodiment can be implemented.

The present disclosure has been described above with reference to specific examples, which are merely intended to aid the understanding of the present disclosure and are not intended to limit the present disclosure. For those skilled in the art to which the present disclosure pertains, a number of simple derivations, variations, or substitutions may be made in accordance with the teachings of the present disclosure. In particular, the body includes not only the above-described embodiments, but also a portable device such as a wristband type or a charging socket.

What is claimed is:

1. An AI voice interaction method, comprising:
an earphone acquiring a user voice, performing an analog-to-digital conversion on the user voice to obtain a digital voice signal, and sending the digital voice signal through a wireless communication;
a body, detachably connected to the earphone, receiving the digital voice signal sent by the earphone, and sending the digital voice signal;
a cloud server receiving the digital voice signal sent by the body, and performing a voice recognition and a semantic analysis on the digital voice signal;
the cloud server sending a communication command to enable the body to make a call, in response to a determination that a semantic analysis result is related to a phone dialing;
the cloud server processing network data based on the semantic analysis result, calling corresponding network data, and sending the network data to the body, in response to a determination that the semantic analysis result is not related to the phone dialing;
the body sending a voice during the call or the network data to the earphone, to make the earphone perform a corresponding voice broadcast;
the earphone sending a search signal through the wireless communication, in response to a determination that a touch key of the earphone is triggered; and
the body receiving and responding to the search signal through the wireless communication to make the body emit at least one of an indicator light prompt and a voice prompt.

2. The method according to claim 1, further comprising:
the body sending a search signal through the wireless communication, in response to a determination that a touch key of the body is triggered; and
the earphone receiving and responding to the search signal through the wireless communication to make the earphone emit at least one of an indicator light prompt and a voice prompt.

3. The method according to claim 1, further comprising:
the body denoising and comparing the user voices respectively picked up from a main earphone and an auxiliary earphone, and merging the user voices into a digital voice signal.

4. The method according to claim 1, wherein the body comprises at least one of the following:
a power indicator light;
a WiFi light configured to indicate a data transmission; and
a SIM card light configured to indicate the use of SIM card traffic.

5. An AI voice interaction system, comprising:
an earphone configured for acquiring a user voice, performing an analog-to-digital conversion on the user voice to obtain a digital voice signal, and sending the digital voice signal through a wireless communication;
a body wirelessly and detachably connected to the earphone, and configured for receiving the digital voice signal sent by the earphone, and sending the digital voice signal; and a cloud server configured for:
receiving the digital voice signal, and performing a voice recognition and a semantic analysis on the digital voice signal;
sending a communication command to enable the body to make a call, in response to a determination that a semantic analysis result is related to a phone dialing; and processing network data based on the semantic analysis result, calling corresponding network data, and sending the network data to the body, in response to a determination that the semantic analysis result is not related to the phone dialing,
wherein the body is further configured for sending the received voice during the call or the network data to the earphone through the wireless communication, to make the earphone perform a corresponding voice broadcast;
wherein the earphone is further configured for sending a search signal through the wireless communication, in response to a determination that a touch key of the earphone is triggered; and
wherein the body is further configured for receiving and responding to the search signal through the wireless communication to make the body emit at least one of an indicator light prompt and a voice prompt.

6. An AI voice interaction device, comprising:
an earphone configured for acquiring a user voice, performing an analog-to-digital conversion on the user voice to obtain a digital voice signal, and sending the digital voice signal through a wireless communication; and
a body wirelessly and detachably connected to the earphone, and configured for:
receiving the digital voice signal sent by the earphone, and sending the digital voice signal;
receiving at least one of a voice during the call and network data sent by an external device; and
sending at least one of the received voice during the call and network data to the earphone through the wireless communication, to make the earphone perform a corresponding voice broadcast,
wherein the body is further configured for receiving a communication command sent by a cloud server to make a call,
wherein the communication command is sent by the cloud server to determine that a semantic analysis result of the digital voice signal is related to a phone dialing;
wherein the earphone comprises:
a speaker;
a pickup;
an earphone processor;
an earphone communication module;
an earphone energy storage circuit;
an earphone magnetic device; and
a power input end, and
when embedded in an earphone slot of the body, the earphone is electrically connected to the body for charging,
wherein the body comprises:
the earphone slot for accommodating a self-locking ejector device, a power output end, and a body magnetic device;
a body PCB;
a charging module; and
a body battery, wherein the self-locking ejector device has a spring structure for separating the earphone from the body when the earphone is taken out from the earphone slot, and wherein the body magnetic device is configured for adsorbing with the earphone magnetic device.

7. The device according to claim 6,
wherein the body PCB is provided with:
   a body processor;
   a first communication module;
   a second communication module;
   a body energy storage circuit; and
   a power output circuit,
   wherein the first communication module is wirelessly connected to the earphone, and
   wherein the second communication module comprises at least one of a mobile data network module, a cellular transceiver, and a WiFi transceiver.

8. The device according to claim 7,
wherein the body is in a car charger type, and further comprises:
   an upper casing;
   a lower casing; and
   a car charger plug,
   wherein the upper casing and the lower casing are clamped to form an outer casing of the body, and
   wherein an upper part of the car charger plug is provided with a spherical rotating head, and the lower casing is sleeved on the spherical rotating head.

9. The device according to claim 7,
wherein the body is in a pendant type, and comprises:
   a front cover;
   a back cover; and
   a necklace,
   wherein the front cover and the back cover are clamped to form an outer casing of the body, and
   wherein the necklace is connected to the outer casing through a ring.

10. The device according to claim 7,
wherein the body is in a waist-hanged type, and comprises:
   a front cover;
   a back cover; and
   a belt,
   wherein the front cover and the back cover are clamped to form an outer casing of the body, and
   wherein the back cover is provided with a through hole for the belt to pass through, and
   wherein the front cover defines an earphone slot.

11. The device according to claim 7,
wherein the body is in a U-shaped neck-hanged type, and both ends of the body are provided with the earphone slot for placing the earphone.

* * * * *